(12) United States Patent
Ashrafzadeh

(10) Patent No.: US 6,369,559 B1
(45) Date of Patent: Apr. 9, 2002

(54) BUCK CONTROLLER COPROCESSOR TO CONTROL SWITCHES

(75) Inventor: Ahmad R. Ashrafzadeh, Tustin, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/713,582

(22) Filed: Nov. 15, 2000

(51) Int. Cl.[7] .............. G05F 1/40; G05F 1/44; G05F 1/56
(52) U.S. Cl. .................. 323/283; 323/284; 323/290
(58) Field of Search ................. 323/283, 282, 323/284, 290, 222

(56) References Cited

U.S. PATENT DOCUMENTS

| | | | | |
|---|---|---|---|---|
| 4,811,184 A | * | 3/1989 | Koninsky et al. | ............ 363/17 |
| 4,816,982 A | * | 3/1989 | Severinsky | ............ 363/44 |
| 4,964,029 A | * | 10/1990 | Severinsky et al. | ............ 363/80 |
| 5,528,125 A | * | 6/1996 | Marshall et al. | ............ 323/222 |
| 5,548,206 A | * | 8/1996 | Soo | ............ 323/284 |
| 5,627,460 A | * | 5/1997 | Bazinet et al. | ............ 323/288 |
| 6,166,528 A | * | 12/2000 | Rossetti et al. | ............ 323/283 |

* cited by examiner

*Primary Examiner*—Bao Q. Vu
(74) *Attorney, Agent, or Firm*—W. Daniel Swayze, Jr.; W. James Brady; Frederick J. Telecky, Jr.

(57) ABSTRACT

A DC converter to connect a first DC voltage to a second DC voltage includes a first switch connected to input the first DC voltage, a second switch connected to the first switch, the first switch and the second switch generating a first main voltage, a third switch connected to the first switch, a fourth switch connected to the third switch, and a latch circuit to control the third switch and to control the fourth switch.

7 Claims, 3 Drawing Sheets

BUCK CONTROLLER COPROCESSOR TO CONTROL SWITCHES

FIELD OF THE INVENTION

The present invention relates to the field of power supplies and, more particularly, to step-down DC-DC converters or step-down switching regulators wherein controlling the main and auxiliary output voltages is desired.

BACKGROUND OF THE INVENTION

Switching regulators, including ripple regulators, are commonly used because of their characteristic of high efficiency and high power density (i.e., power-to-volume ratio) resulting from smaller magnetic, capacitive, and heat sink components. Switching regulators indirectly regulate an average DC output voltage by selectively storing energy by switching energy on and off an inductor. By comparing the output voltage to a reference voltage, the inductor current is controlled to provide the desired output voltage.

Synchronous buck power stages are a specific type of switching regulator that use two power switches such as power MOSFET transistors to control current in the output inductor. A high-side switch selectively couples the inductor to a positive power supply while a low-side switch selectively couples the inductor to ground. A control processor typically referred to as a pulse width modulation (PWM) is used to control the high-side and low-side switches. Synchronous buck regulators provide high efficiency when low on-resistance power MOSFET devices are used.

For DC-DC converters, there is a need for a converter that can provide an auxiliary regulated voltage in addition to the main output voltage. It is desirable to synchronize these two main and auxiliary converters as well as track the main and auxiliary voltages. The prior art typically has utilized independent controllers to control the main DC-DC converter and the auxiliary DC-DC converter.

SUMMARY OF THE INVENTION

The present invention provides a circuit that controls an auxiliary voltage with the help of the main controller. This circuit provides switching synchronization, which is inherent in the topology, as well as tracking the auxiliary voltage with the main output voltage, desirable in many applications. Synchronization is achieved by turning on the upper switches at the same time, with the use of an edge trigger. Tracking is achieved by referencing the auxiliary output to the main output.

DETAILED DESCRIPTION OF THE PRESENT INVENTION

Figure 1:
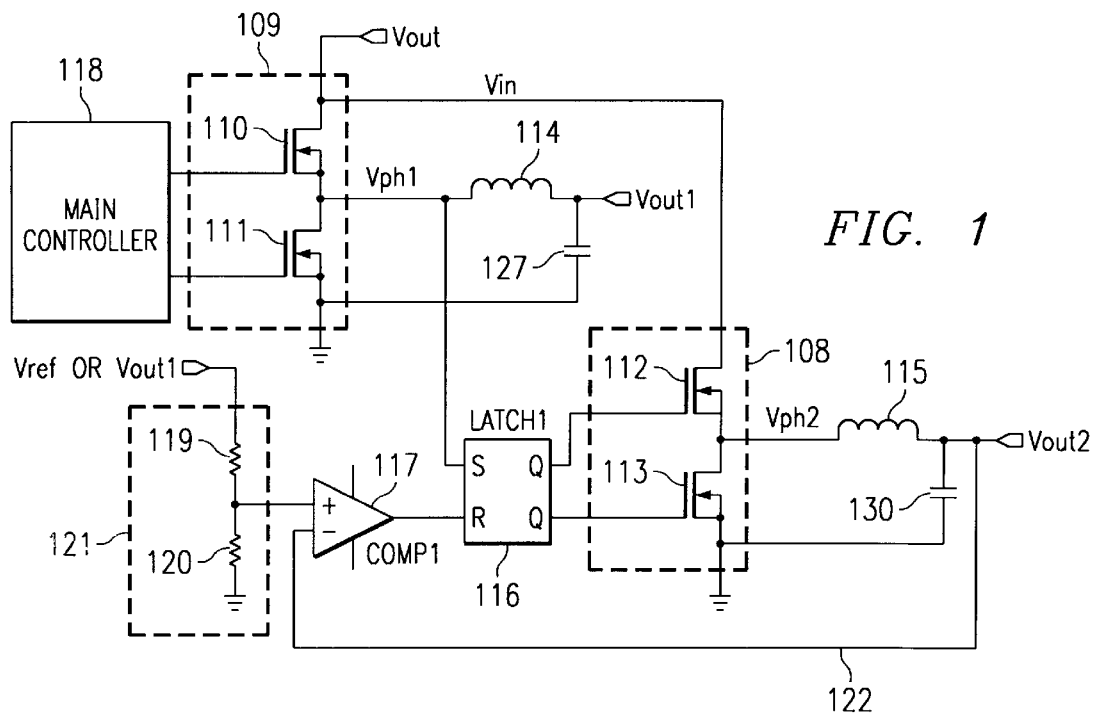
FIG. 1 illustrates a circuit of the present invention.

Turning now to FIG. 1, FIG. 1 illustrates a main controller 118, which may be a PWM controller to control a main switch circuit 109 including a high-side power MOSFET 110 and a low-side power MOSFET 111. Additionally, the present invention includes an auxiliary switch circuit 108 including high-side power MOSFET 112 and low-side power MOSFET 113. The main controller 118 controls the gate of high-side power MOSFET 110 and low-side power MOSFET 111 such that the high-side power MOSFET 110 is not on at the same time as the low-side power MOSFET 111. The drain of high-side power MOSFET 111 is connected to a reference, for example, such as 5 volts, indicated by voltage $V_{IN}$. The source of high-side power MOSFET 110 and the drain of low-side power MOSFET 111 are connected together. Additionally, this common connection is connected to inductor 114. The other end of inductor 114 is connected to capacitor 122. Although not shown, a resistor may be connected in parallel to capacitor 122. The other end of capacitor 122 is coupled to the source of low-side power MOSFET 111 and ground. The inductor 114, in combination with capacitor 122, generates a voltage which is the main voltage $V_{OUT1}$. In addition, a latch circuit 116 has an input connected to the source of high-side power MOSFET 110 and the drain of low-side power MOSFET 111. Additionally, the latch circuit 116 is connected to (through some anti-shoot through logic and switch driver, not shown here) the auxiliary switching circuit 108 which includes the high-side power MOSFET 112 and the low-side power MOSFET 113. The drain of high-side power MOSFET 112 is connected to voltage $V_{IN}$ and to the drain of high-side power MOSFET 110. Other alternates are shown below. The source of high-side power MOSFET 112 is connected to the drain of low-side power MOSFET 113. The connection point between the source of high-side power MOSFET 112 and the low-side power MOSFET 113 is connected to one end of inductor 115, and the other end of inductor 115 is connected to capacitor 130. Capacitor 130 in conjunction with inductor 115 generates an auxiliary voltage designed by voltage $V_{OUT2}$. Additionally, connected to the other end of inductor 115 and to capacitor 130 is a feedback line 116 to the input of comparator 117. Additionally, a voltage divider circuit 121 includes two resistors connected in series, namely resistor 119 and resistor 120. Input to one end of resistor 119 is the main voltage, namely $V_{OUT1}$, or, in the alternative, a second reference voltage. The other end of resistor 119 is connected to the other input terminal of comparator 117 as well as resistor 120. The other end of resistor 120 is connected to ground. As a consequence, the voltage input to comparator 117 is based on the ratio of the resistance of resistor 119 and the resistance of resistor 120. The output of comparator 117 is connected to latch 116, more particularly, to the reset input of latch 116. The set input of latch 116 is connected between the high-side power MOSFET 111 and the low-side power MOSFET 110. The output of latch circuit 116 is connected to the gate of high-side power MOSFET 112 and the low-side power MOSFET 113 of the secondary switch. More particularly, the Q output, known as the data output, of the latch circuit 116 is connected to and controls the gate of power MOSFET 112, and the $\overline{Q}$ output, known as the inverse of the data output, of latch circuit 116 is connected to and controls the gate of low-side power MOSFET 113. The outputs going through an anti-shoot through logic and buffer that are not shown here.

Input to the latch 116 is triggered by turn on of the switch 110. Consequently the switch 112 is turned on at the same time as the switch 110, assuming the delay in the latch and logic is negligible. This will result in switching synchronization between the two converters. The comparator 117 is comparing the auxiliary output to the output of voltage divider network 121. When the auxiliary output exceeds this voltage, the comparator 117 will reset the latch 116, which in turn causes the upper switch 112 to turn off and switch 113 to turn on. This will result in a regulated average DC voltage $V_{OUT2}$ that is equal to the output voltage of the divider network 121. The output of the divider network 121 is going to track its input, which is the $V_{OUT1}$, resulting in auxiliary voltage to track the main voltage.

Tracking is important when the DC-DC converter is being used with integrated circuits which requires two levels of voltage, one for the core and one for IO. Thus, tracking is to bring up both voltages, namely voltage $V_{OUT1}$ and voltage $V_{OUT2}$ such that both of these voltages rise at the same time.

In operation, the main controller 118 turns on high-side power MOSFET 110. After high-side power MOSFET 110 is turned on, a signal is set to the set input of latch circuit 116 indicating a voltage between high-side power MOSFET 110 and low-side power MOSFET 111. Since no reset signal to the reset input of latch circuit 116 is received from comparator 117, the Q output of latch circuit 116 is activated to activate high-side power MOSFET 112. Thus, voltage $V_{OUT2}$ is generated. The main controller 118 then turns off high-side power MOSFET 110 and then the main controller 118 turns on the low-side power MOSFET 111. The voltage $V_{OUT2}$ is sensed by comparator 117, and as soon as the voltage $V_{OUT2}$ exceeds the reduced voltage based upon the main voltage $V_{OUT1}$ through divider network circuit 121, comparator 117 is activated to send a reset signal to the reset input of latch circuit 116. The latch circuit 116, upon receiving the reset signal from comparator 117, stops outputting the output from the Q output of latch circuit 116 and outputs a signal from the $\overline{Q}$ output of latch 116. Thus, the high-side power MOSFET 112 stops operating after the Q output from latch circuit 116 stops, and the low-side power MOSFET 113 begins conducting as soon as the output $\overline{Q}$ of the latch circuit 116 is output. Thus, the circuit produces an auxiliary voltage or a reduced voltage from the main voltage which is synchronized and tracked.

Figure 2:
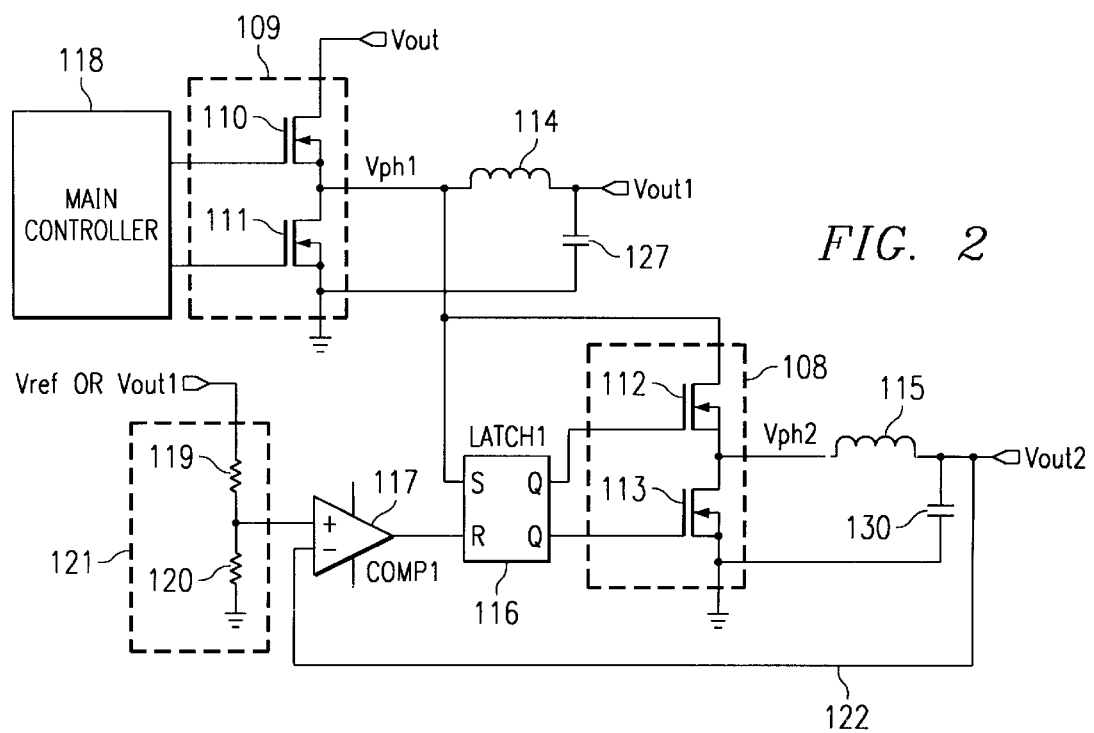
FIG. 2 illustrates another circuit of the present invention.

FIG. 2 illustrates another circuit of the present invention. In this circuit, the drain of high-side MOSFET 112 is connected to the common connection of the source of high-side MOSFET 110 and the drain of low-side power MOSFET 111. Additionally, the connection from the drain of power MOSFET 110 to the drain of high-side power MOSFET 112 has been removed. If the main controller 118 has over current protection trough switch 110, this will result in an overall over current protection for both the main and auxiliary outputs.

Figure 3:
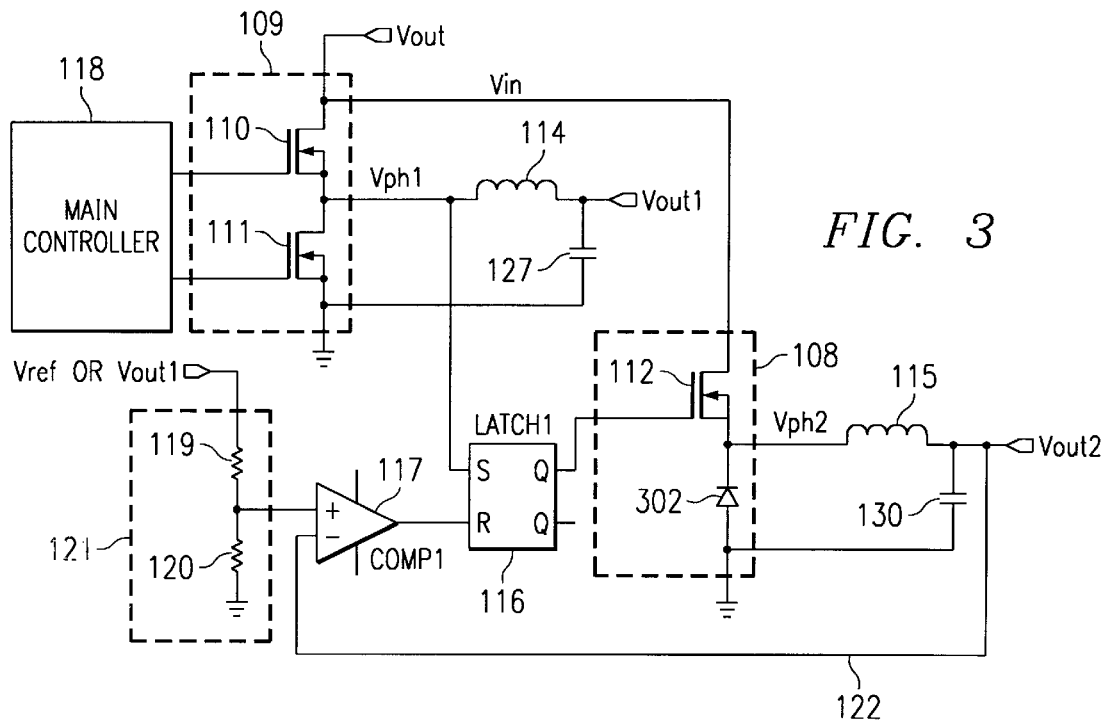
FIG. 3 illustrates another circuit of the present invention.

FIG. 3 illustrates another circuit of the present invention. In FIG. 3, the low-side power switch MOSFET 113 is replaced with a diode 302.

Figure 4:
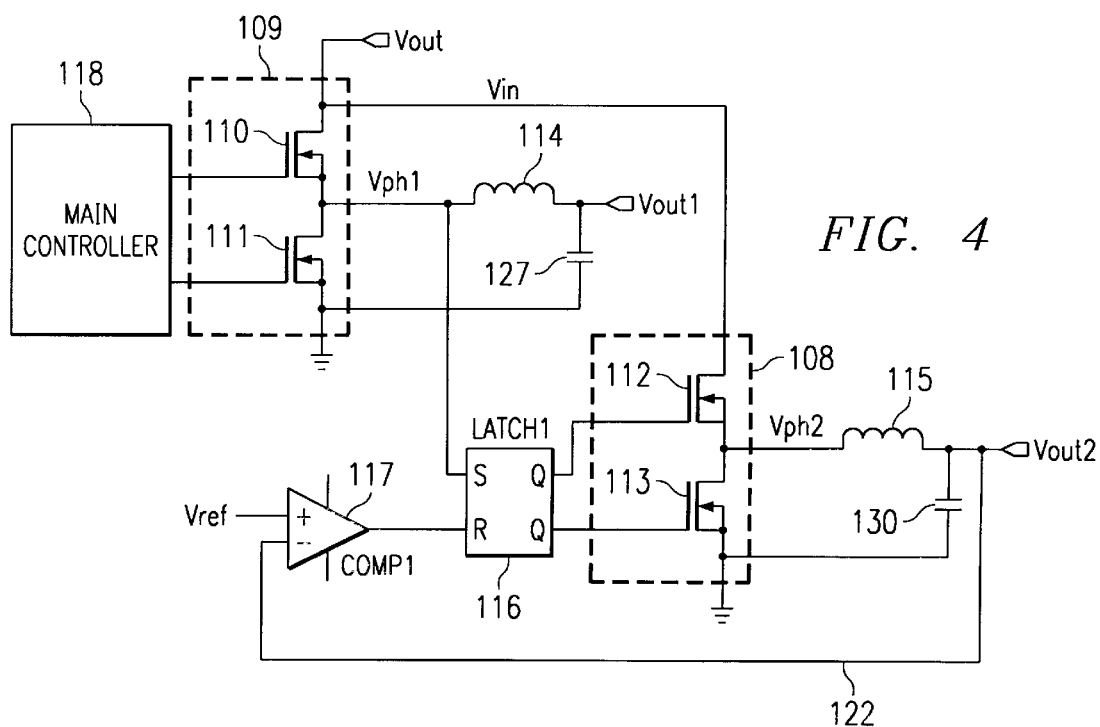
FIG. 4 illustrates another circuit of the present invention.

FIG. 4 illustrates another circuit of the present invention. In FIG. 4, the "+" input to capacitor 117 is voltage referral The other input is voltage $V_{OUT2}$.

Figure 5:
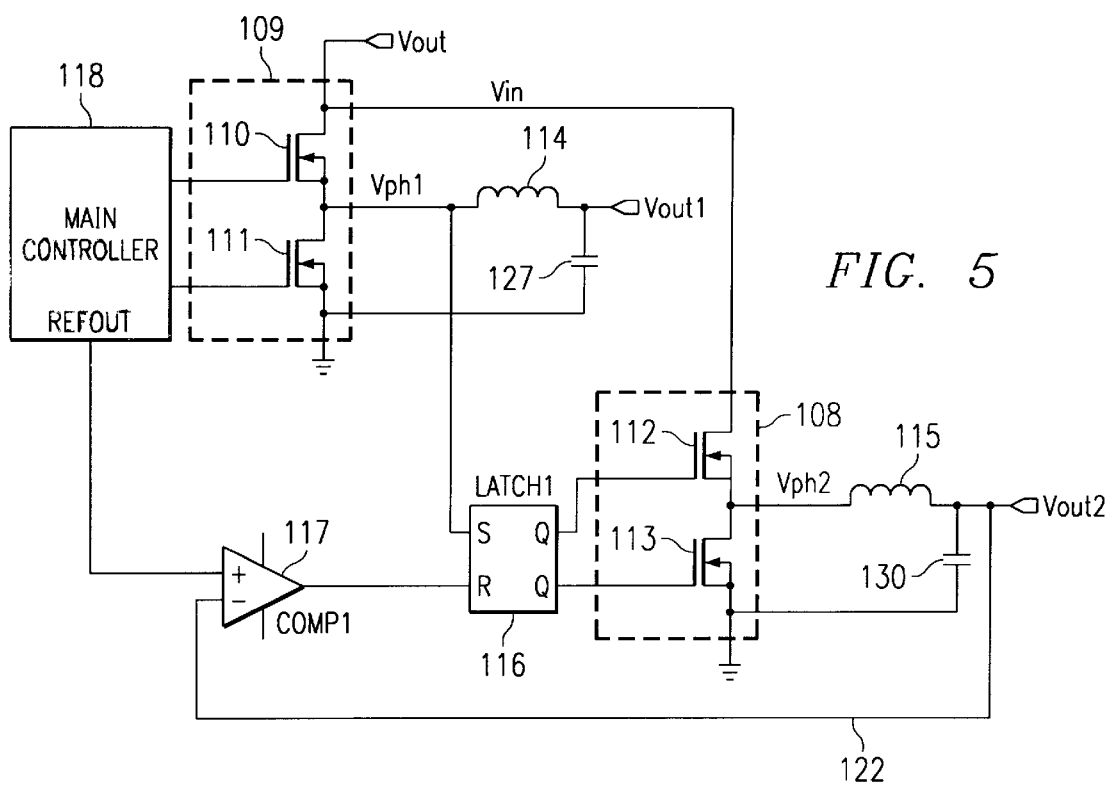
FIG. 5 illustrates another circuit of the present invention.

FIG. 5 illustrates another circuit of the present invention.

The reference to capacitor 117 is provided from the reference on the main controller 118.

What is claimed is:

1. A DC converter to convert a first DC voltage to a second DC voltage, comprising:

a first switch connected to input said first DC voltage;

a second switch connected to said first switch;

said first switch and said second switch generating a first main voltage;

a third switch connected to said first switch;

a fourth switch connected to said third switch; and a latch circuit coupled to said first switch and said second switch and a comparator to control said third switch and to control said fourth switch.

2. A DC converter, as in claim 1, wherein said latch circuit is connected to a comparator circuit to compare said second DC voltage to a reduced first main voltage.

3. A DC converter, as in claim 2, wherein said reduced first main voltage is generated by a half-bridge circuit.

4. A DC converter, as in claim 2, wherein said comparator circuit is connected to a reset input of said latch circuit.

5. A DC converter, as in claim 1, wherein a set input of said latch circuit is connected between said first switch and said second switch.

6. A DC converter, as in claim 1, wherein a data output of said latch circuit is connected to control said third switch.

7. A DC converter, as in claim 1, wherein an inverse data output of said latch circuit is connected to control said fourth switch.

\* \* \* \* \*